(12) United States Patent
Park et al.

(10) Patent No.: US 12,216,258 B2
(45) Date of Patent: Feb. 4, 2025

(54) PRISM ACTUATOR

(71) Applicant: LG INNOTEK CO., LTD., Seoul (KR)

(72) Inventors: Sang Ok Park, Seoul (KR); Seong Min Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 166 days.

(21) Appl. No.: 17/795,664

(22) PCT Filed: Feb. 4, 2021

(86) PCT No.: PCT/KR2021/001465
§ 371 (c)(1),
(2) Date: Jul. 27, 2022

(87) PCT Pub. No.: WO2021/158033
PCT Pub. Date: Aug. 12, 2021

(65) Prior Publication Data
US 2023/0072601 A1 Mar. 9, 2023

(30) Foreign Application Priority Data
Feb. 6, 2020 (KR) .......................... 10-2020-0014405

(51) Int. Cl.
*G02B 13/00* (2006.01)
*G02B 7/18* (2021.01)
(Continued)

(52) U.S. Cl.
CPC ....... *G02B 13/0065* (2013.01); *G02B 7/1805* (2013.01); *G02B 26/0825* (2013.01);
(Continued)

(58) Field of Classification Search
CPC .............. G02B 13/0065; G02B 7/1805; G02B 26/0825; G03B 5/00; G03B 2205/0076; G03B 2205/003
See application file for complete search history.

(56) References Cited

U.S. PATENT DOCUMENTS

2009/0122406 A1   5/2009   Rouvinen et al.
2010/0060776 A1*  3/2010   Topliss .................. H04N 23/67
                                                    348/340

(Continued)

FOREIGN PATENT DOCUMENTS

JP    2009-526257 A    7/2009
JP    2020-8650 A      1/2020
(Continued)

*Primary Examiner* — Minh Q Phan
(74) *Attorney, Agent, or Firm* — Birch, Stewart, Kolasch & Birch, LLP

(57) ABSTRACT

The present embodiment relates to a prism actuator comprising: a housing; a holder having at least a part spaced apart from the housing; a prism disposed on the holder; a shape memory alloy member for connecting the housing and the holder to each other; and an elastic member for connecting the housing and the holder to each other, wherein the shape memory alloy member comprises first and second shape memory alloy members disposed on one side of the prism, the first shape memory alloy member connects an upper part of the holder and a lower part of the housing to each other, and the second shape memory alloy member connects a lower part of the holder and an upper part of the housing to each other.

16 Claims, 17 Drawing Sheets

(51) Int. Cl.
*G02B 26/08* (2006.01)
*G03B 5/00* (2021.01)
*G03B 30/00* (2021.01)

(52) U.S. Cl.
CPC ............... *G03B 5/00* (2013.01); *G03B 30/00* (2021.01); *G03B 2205/003* (2013.01); *G03B 2205/0076* (2013.01)

(56) References Cited

U.S. PATENT DOCUMENTS

2018/0321504 A1   11/2018  Hu et al.
2021/0294068 A1*  9/2021  Que ..................... F03G 7/0636

FOREIGN PATENT DOCUMENTS

| | | | |
|---|---|---|---|
| KR | 10-2009-0081855 A | | 7/2009 |
| KR | 20190114588 A | * | 10/2019 |
| WO | WO 2018/135732 A1 | | 7/2018 |
| WO | WO 2018/158590 A1 | | 9/2018 |

* cited by examiner

PRISM ACTUATOR

CROSS REFERENCE TO RELATED APPLICATIONS

This application is the National Phase of PCT International Application No. PCT/KR2021/001465, filed on Feb. 4, 2021, which claims priority under 35 U.S.C. 119 (a) to Patent Application No. 10-2020-0014405, filed in the Republic of Korea on Feb. 6, 2020, all of which are hereby expressly incorporated by reference into the present application.

TECHNICAL FIELD

The present invention relates to a prism actuator.

BACKGROUND ART

As the spread of various portable terminals is widely generalized and wireless Internet services are commercialized, the demands of consumers related to portable terminals are also diversifying, so that various types of additional devices are being installed in the portable terminals.

Among them, there is a camera module for photographing a subject as a photograph or a moving picture. The number of pixels of a camera device is increasing rapidly, and it is being developed aiming the performance equivalent to that of a digital camera.

There is a problem in that the height of the camera device must be increased in order to increase the zoom performance, which is lower than that of a digital camera. A method of laying the camera device down and refracting light using a prism has been proposed. However, in this case, it is difficult to correct hand-shake.

DETAILED DESCRIPTION OF THE INVENTION

Technical Subject

The present embodiment is intended to provide a prism actuator that performs a hand-shake correction function by moving a prism.

Technical Solution

The prism actuator according to the present embodiment comprises: a housing; a holder having at least a part being spaced apart from the housing; a prism being disposed on the holder; a shape memory alloy member for connecting the housing and the holder to each other; and an elastic member for connecting the housing and the holder to each other, wherein the shape memory alloy member comprises first and second shape memory alloy members being disposed on one side of the prism, the first shape memory alloy member connects an upper part of the holder and a lower part of the housing to each other, and the second shape memory alloy member connects a lower part of the holder and an upper part of the housing to each other.

The holder may be tilted about a first virtual central axis, and the first central axis may pass between the first and second shape memory alloy members.

The shape memory alloy member comprises third and fourth shape memory alloy members being disposed on the other side of the prism, and the first central axis may pass between the first and second shape memory alloy members and between the third and fourth shape memory alloy members.

The lengths of the first and third shape memory alloy members decrease when the lengths of the second and fourth shape memory alloy members increase and may increase when the lengths of the second and fourth shape memory alloy members decrease.

The holder comprises: a first side surface to which the first and second shape memory alloy members are coupled; and a second side surface to which the third and fourth shape memory alloy members are coupled, wherein a protrusion comprising a curved surface is formed on each of the first side surface and the second side surface of the holder, and wherein the curved surface of the protrusion of the holder may be disposed in the housing.

The shape memory alloy member may be coupled to the housing at one end and coupled to the holder at the other end.

The shape memory alloy member comprises: a first coupling part being coupled to the housing; a second coupling part being coupled to the holder; and a connection part connecting the first coupling part and the second coupling part, wherein at least a part of the connection part may be formed of a shape memory alloy member.

The first coupling part of the shape memory alloy member may be fixed to the housing by an adhesive.

The second coupling part of the shape memory alloy member may comprise a hole in the shape of a circle, and the holder may comprise a protrusion inserted into the hole of the second coupling part.

The connection part may comprise a shape memory alloy member wire.

It comprises a substrate disposed in the housing; the elastic member comprises a first coupling part being coupled to the housing, a second coupling part being coupled to the holder, a connection part connecting the first coupling part and the second coupling part, and a terminal part being coupled to the substrate; and the shape memory alloy member may be electrically connected to the substrate through the elastic member.

The elastic member may comprise an upper elastic member coupled to an upper surface of the holder, and a lower elastic member coupled to a lower surface of the holder.

The prism actuator may comprise: a first damper being disposed on a part of an upper surface of the holder that is spaced apart from the first central axis; and a second damper being disposed on a part spaced apart from the first central axis of a lower surface of the holder.

The first and fourth shape memory alloy members are disposed diagonally opposite to each other, and the second and third shape memory alloy members may be disposed diagonally opposite to each other.

The camera device according to the present embodiment may comprise: a printed circuit board; an image sensor being disposed on the printed circuit board; a prism actuator; a lens being disposed between the image sensor and the prism actuator; and a lens driving device for moving the lens.

An optical device according to the present embodiment may comprise the camera device.

The prism actuator according to the present embodiment comprises: a housing; a holder having at least a part being spaced apart from the housing; a prism being disposed on the holder; a shape memory alloy member connecting the housing and the holder; and an elastic member connecting the housing and the holder, wherein the shape memory alloy member comprises first and second shape memory alloy members being disposed on one side of the prism, and wherein the length of the first shape memory alloy member decreases when the length of the second shape memory alloy member increases and may increase when the length of the second shape memory alloy member decreases.

Advantageous Effects

Through the present embodiment, the hand shake correction function can be performed by moving the prism.

BRIEF DESCRIPTION OF DRAWINGS

FIG. 13b is a partial see-through view in which a prism is coupled to FIG. 13a.

BEST MODE

Figure 1:
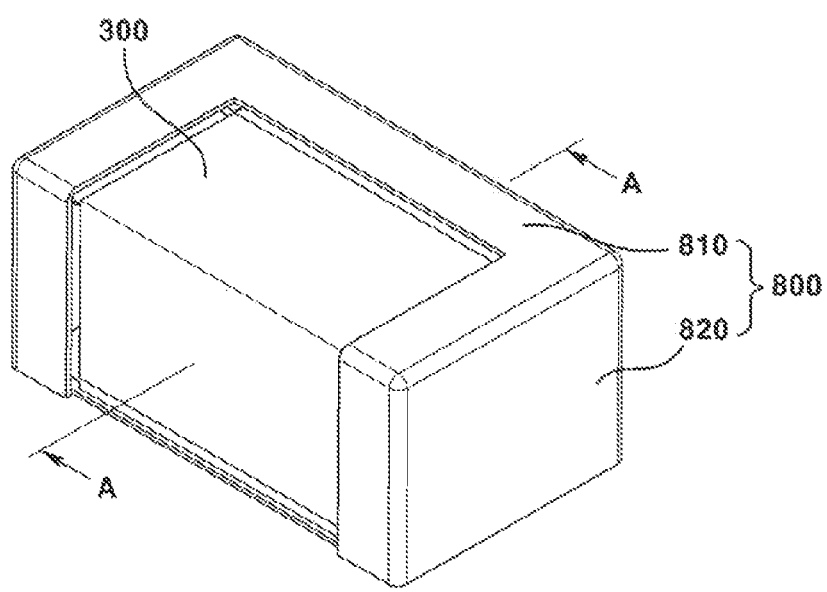
FIG. 1 is a perspective view of a prism actuator according to the present embodiment.

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as "at least one (or more than one) of A and B and C", it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when described as being formed or disposed in "on (above)" or "below (under)" of each component, "on (above)" or "below (under)" means that it comprises not only the case where the two components are directly in contact with, but also the case where one or more other components are formed or disposed between the two components. In addition, when expressed as "on (above)" or "below (under)", the meaning of not only an upward direction but also a downward direction based on one component may be comprised.

An 'optical axis direction' used hereinafter is defined as an optical axis direction of a lens and/or an image sensor being coupled to a lens driving device. In the present embodiment, the direction of the optical axis can be changed by a prism.

The 'auto focus (AF) function' used hereinafter is defined as a function in which, in order to obtain a clear image of a subject on the image sensor, a lens is moved in an optical axis direction according to the distance of the subject and the distance from the image sensor is adjusted to automatically focus on the subject. In addition, 'closed-loop auto focus (CLAF) control' is defined as real-time feedback control of a lens position by detecting the distance between the image sensor and the lens for enhancing the accuracy of focus adjustment.

The 'optical image stabilization (OIS) function' used hereinafter is defined as a function of moving or tilting the lens in a direction perpendicular to the optical axis to offset the vibration (movement) generated in the image sensor by an external force. However, in the present embodiment, hand-shake correction in one direction can be implemented only by the movement of the prism, not by the movement of the lens.

Hereinafter, the configuration of the prism actuator according to the present embodiment will be described with reference to the drawings.

Figure 2:
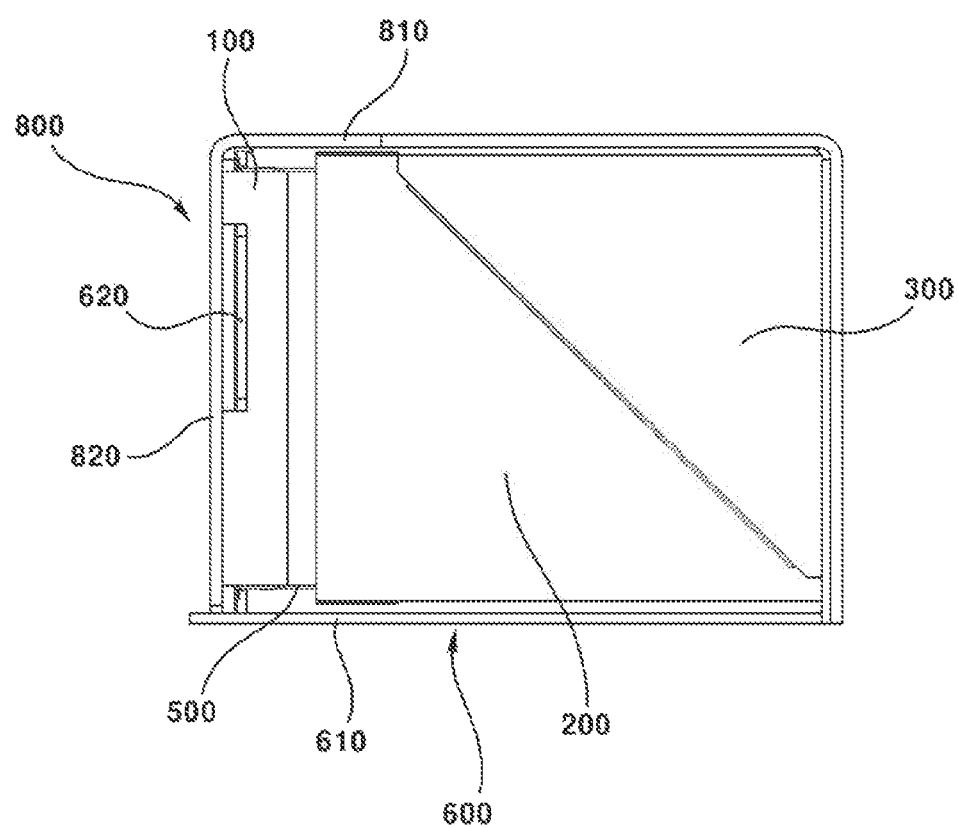
FIG. 2 is a cross-sectional view taken along line A-A of FIG. 1.
Figure 3:
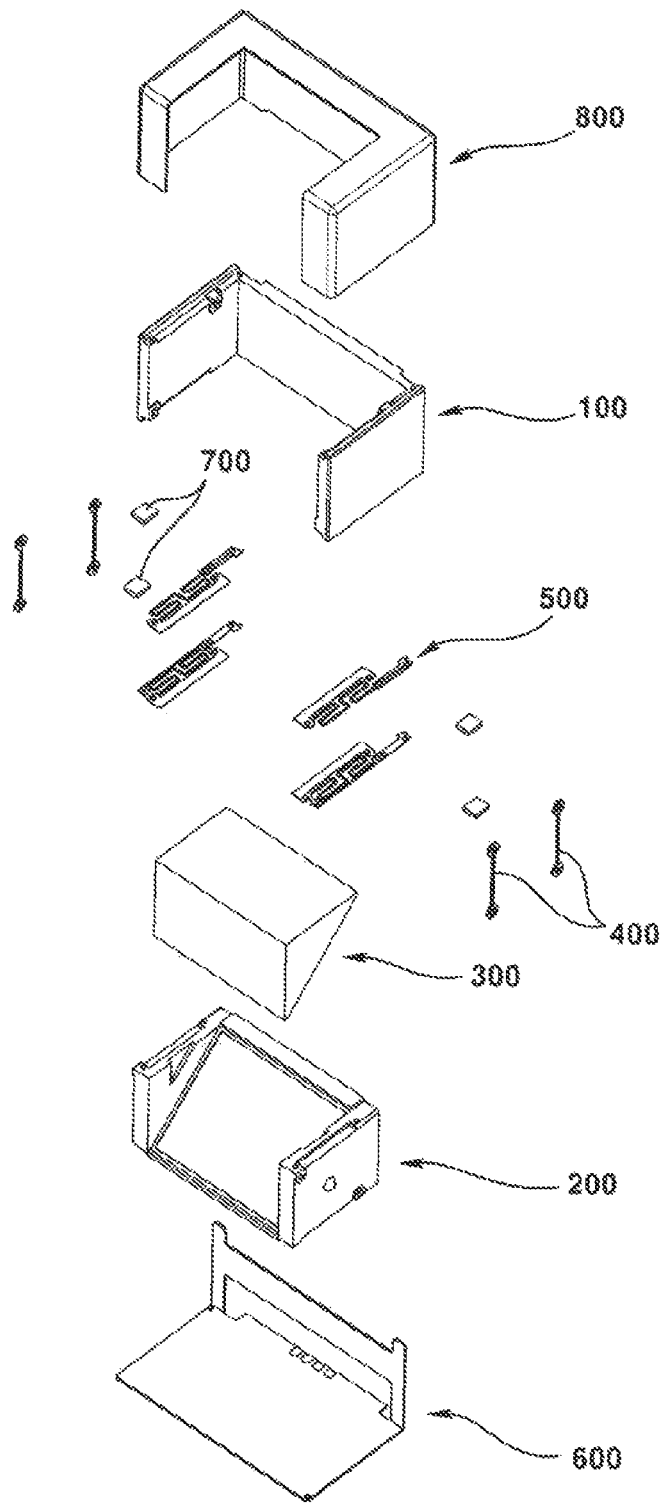
FIG. 3 is an exploded perspective view of a prism actuator according to the present embodiment.
Figure 4:
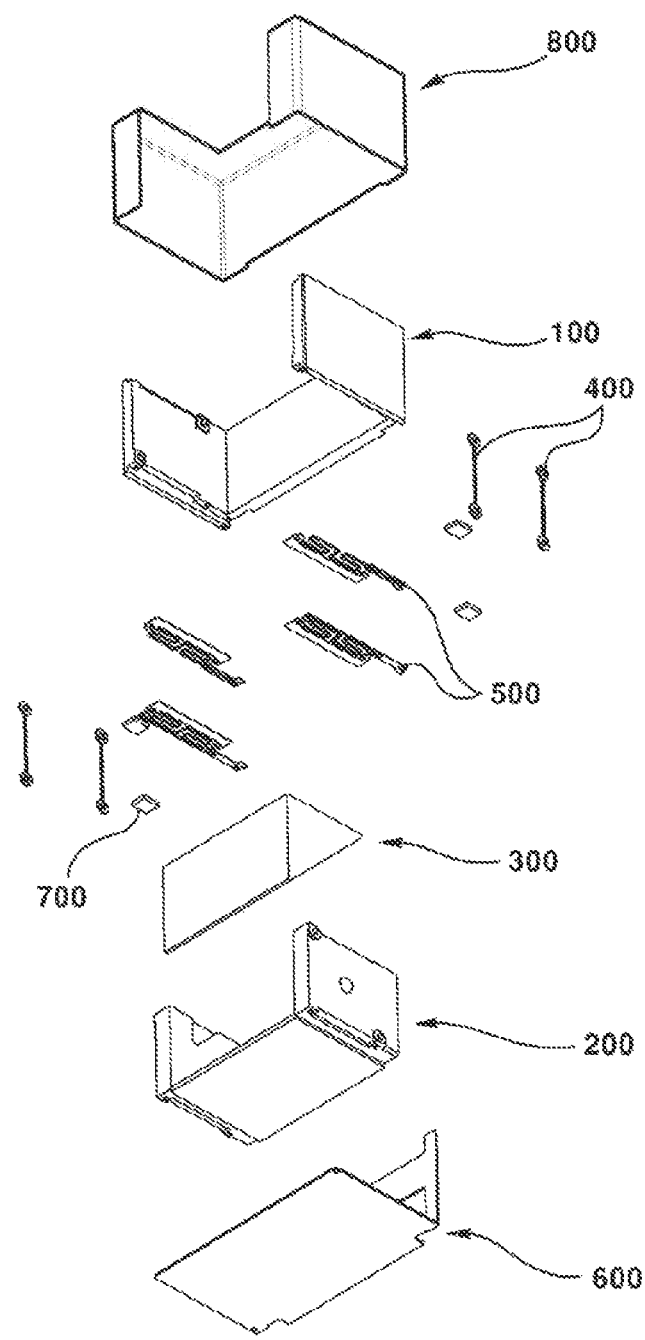
FIG. 4 is an exploded perspective view of a prism actuator viewed from a different direction from FIG. 3.
Figure 5:
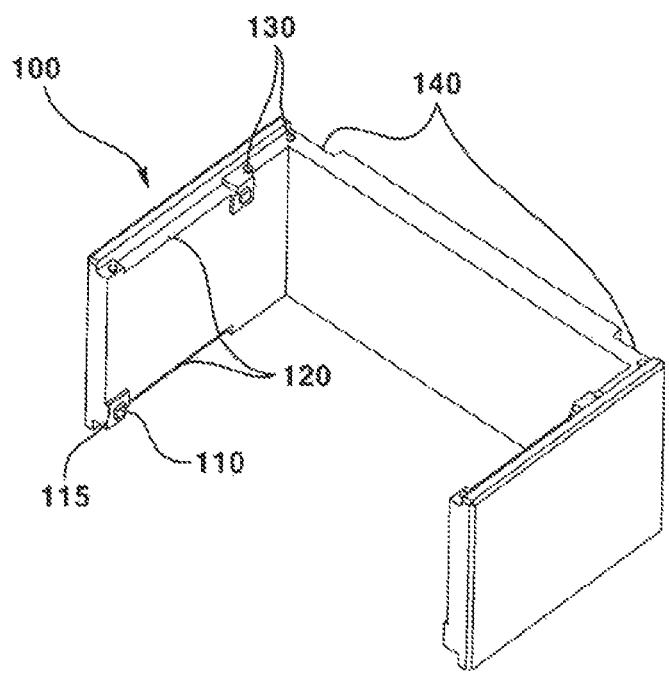
FIG. 5 is a perspective view of a housing of a prism actuator according to the present embodiment.
Figure 6:
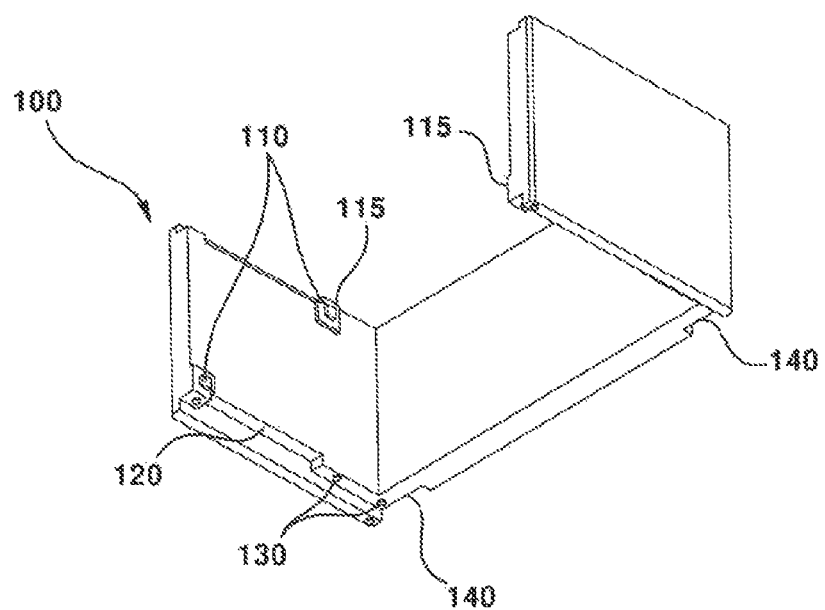
FIG. 6 is a perspective view of a housing viewed from a different direction from that of FIG. 5.
Figure 7:
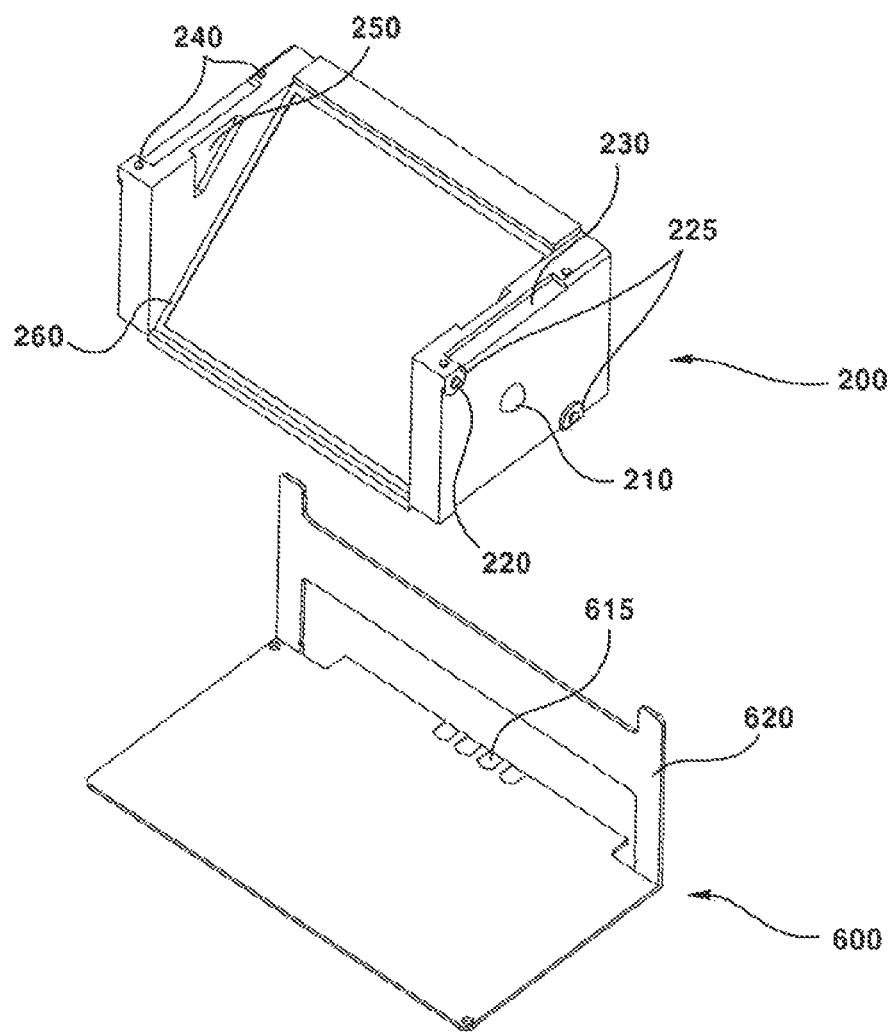
FIG. 7 is an exploded perspective view of a holder and a substrate of a prism actuator according to the present embodiment.
Figure 8:
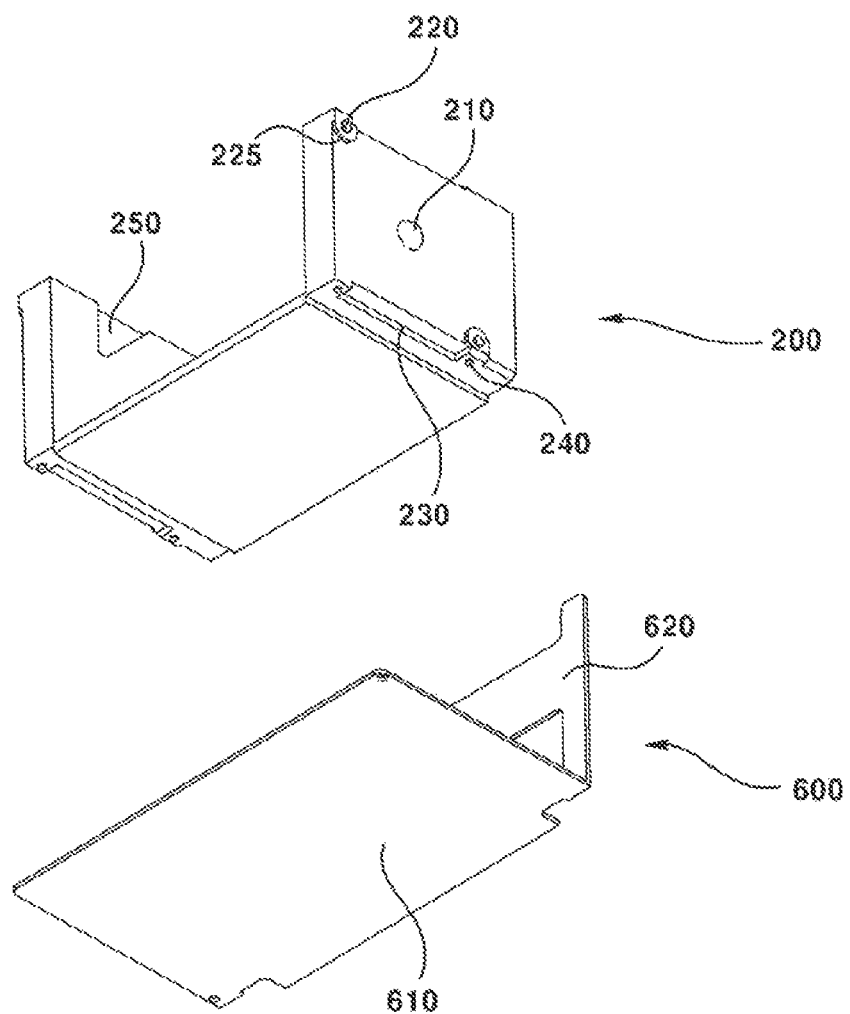
FIG. 8 is an exploded perspective view of a holder and a substrate viewed from a different direction from FIG. 7.
Figure 9:
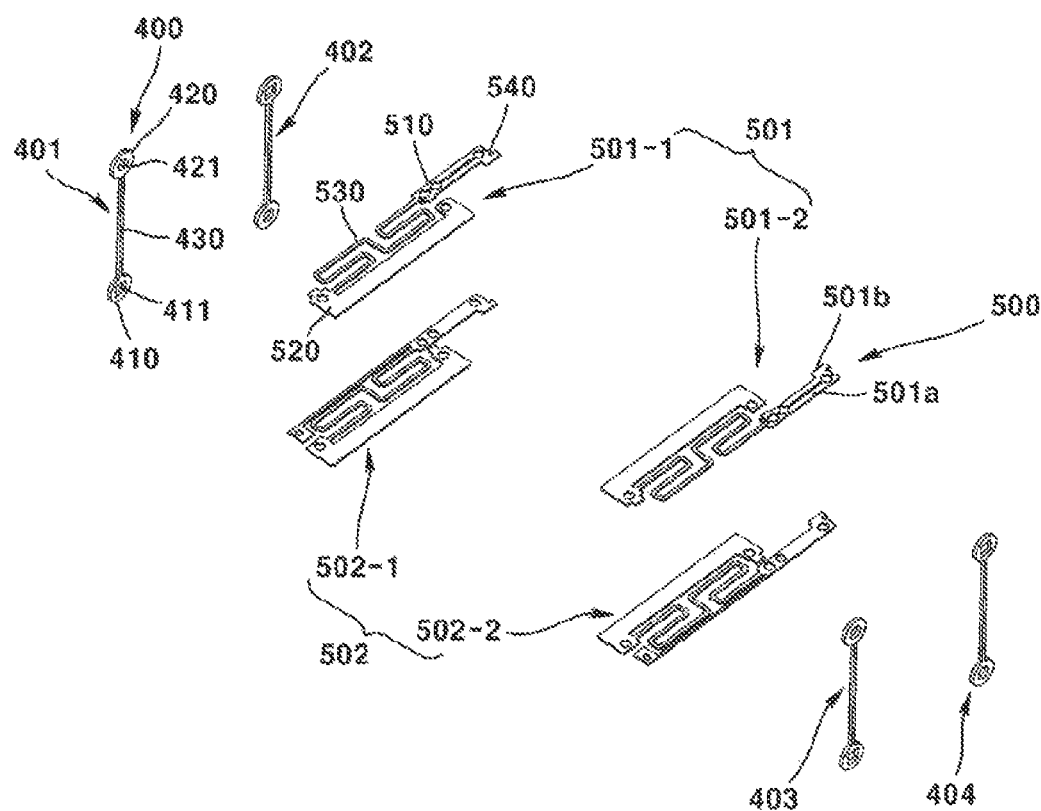
FIG. 9 is an exploded perspective view of a shape memory alloy member and an elastic member of a prism actuator according to the present embodiment.
Figure 10:
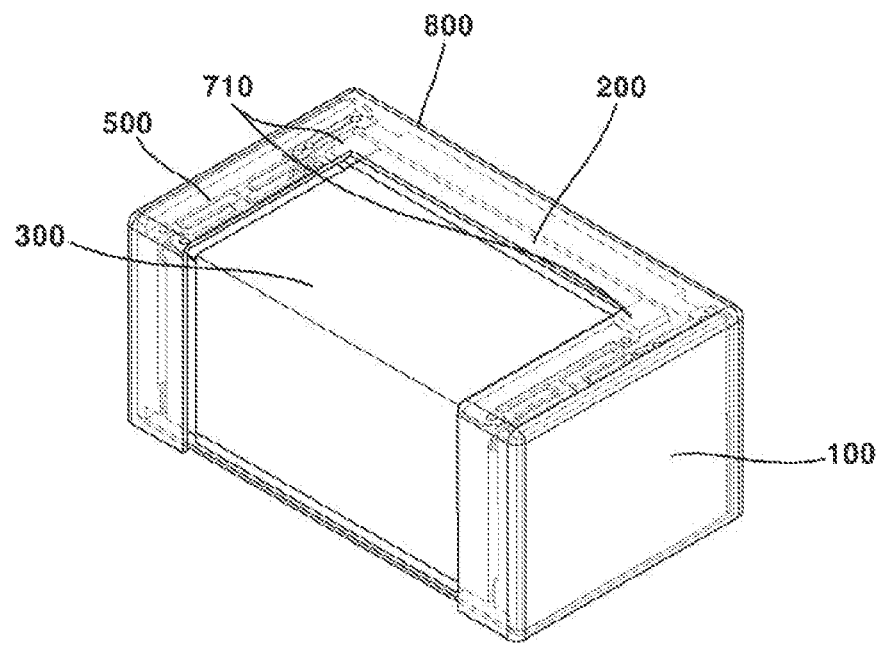
FIG. 10 is a see-through view of a prism actuator according to the present embodiment.
Figure 11:
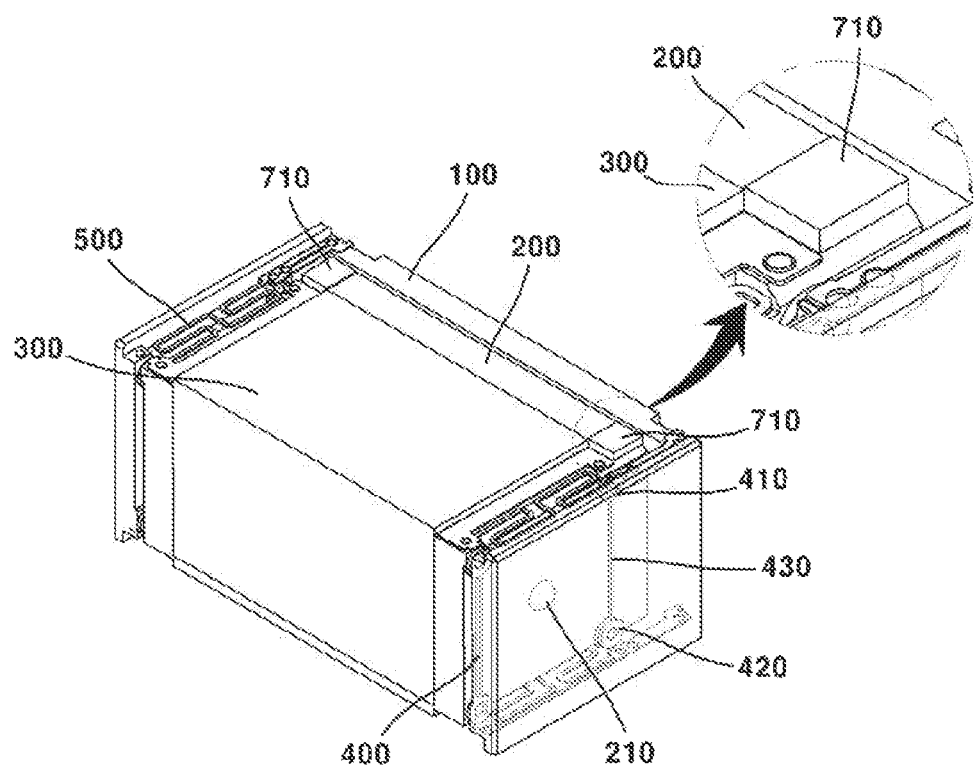
FIG. 11 is a perspective view of a state in which a cover and a substrate are omitted from a prism actuator according to the present embodiment.
Figure 12:
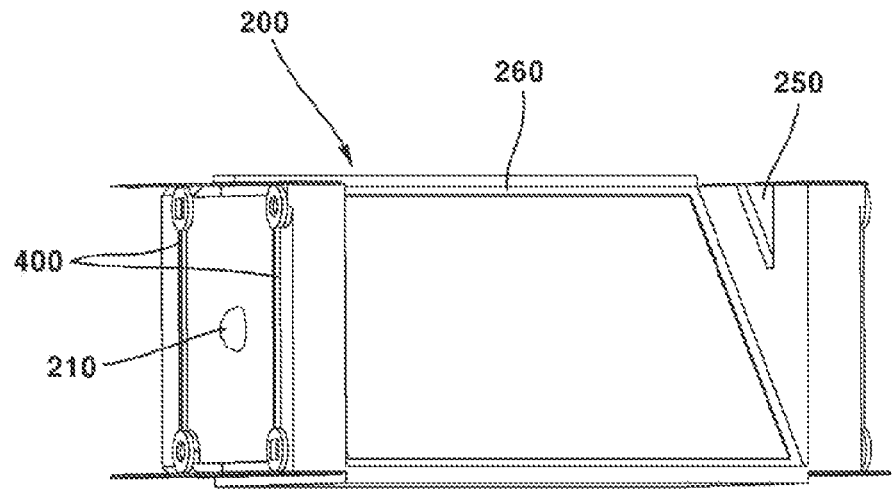
FIG. 12 is a perspective view of a part of a prism actuator according to the present embodiment.
Figure 13A:
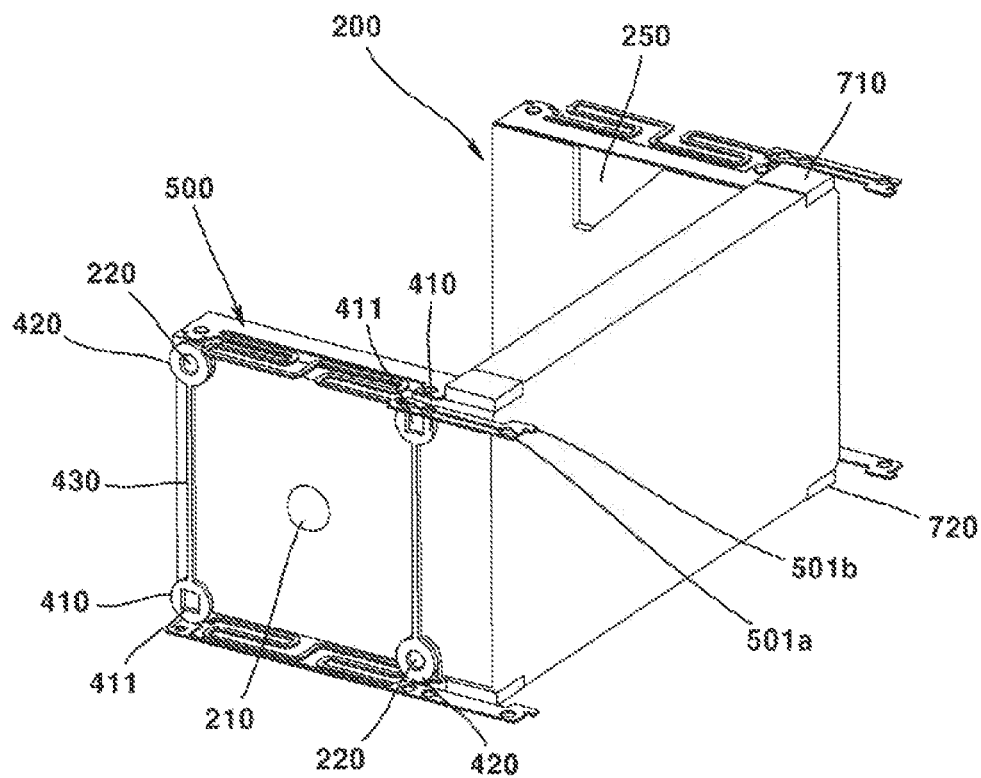
FIG. 13a is a perspective view of a part of a prism actuator as viewed from a different direction from FIG. 12.
Figure 13B:
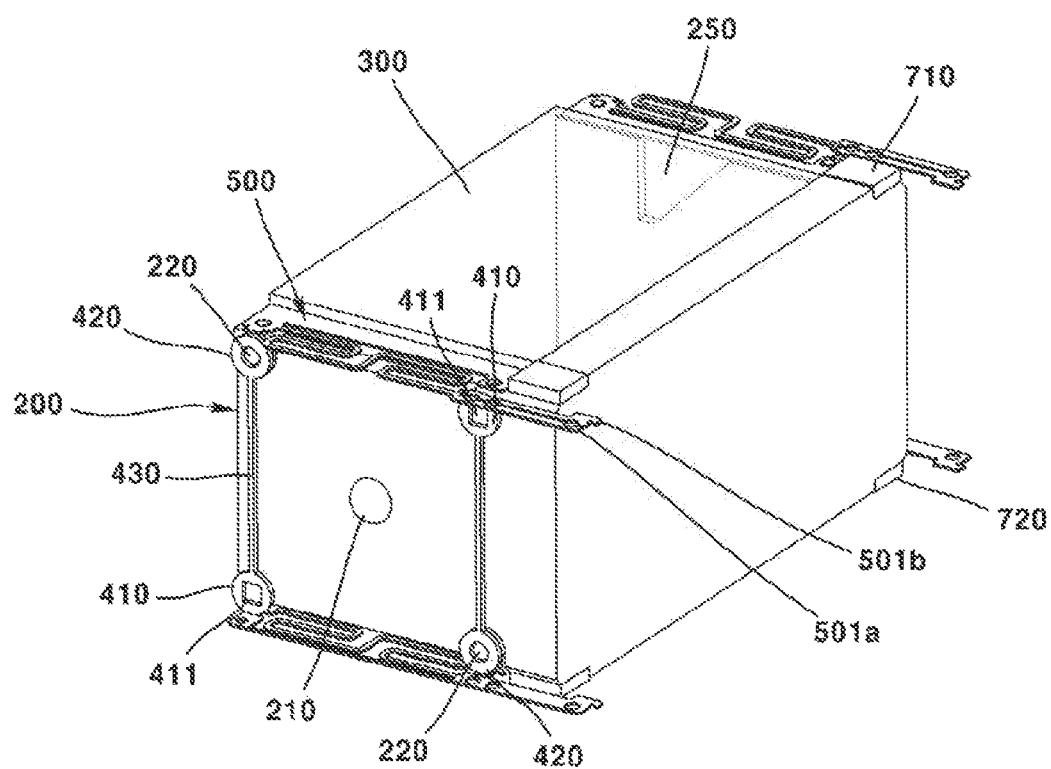
Figure 14:
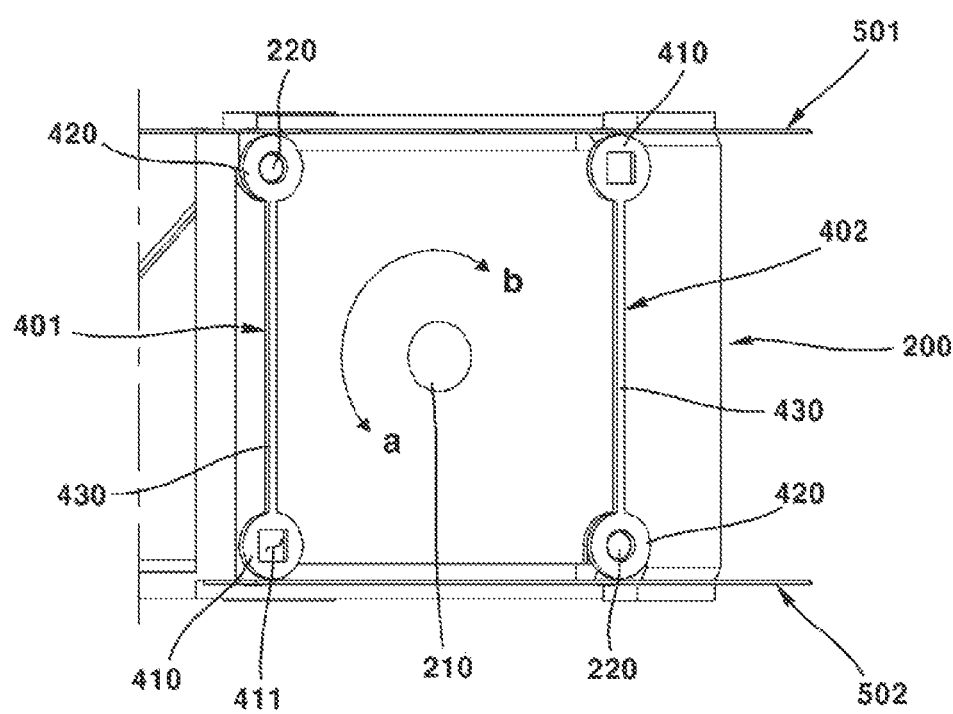
FIG. 14 is a diagram illustrating a tilt direction of a prism actuator according to the present embodiment.

FIG. 1 is a perspective view of a prism actuator according to the present embodiment; FIG. 2 is a cross-sectional view taken along line A-A of FIG. 1; FIG. 3 is an exploded perspective view of a prism actuator according to the present embodiment; FIG. 4 is an exploded perspective view of a prism actuator viewed from a different direction from FIG. 3; FIG. 5 is a perspective view of a housing of a prism actuator according to the present embodiment; FIG. 6 is a perspective view of a housing viewed from a different direction from that of FIG. 5; FIG. 7 is an exploded perspective view of a holder and a substrate of a prism actuator according to the present embodiment; FIG. 8 is an exploded perspective view of a holder and a substrate viewed from a different direction from FIG. 7; FIG. 9 is an exploded perspective view of a shape memory alloy member and an elastic member of a prism actuator according to the present embodiment; FIG. 10 is a see-through view of a prism actuator according to the present embodiment; FIG. 11 is a perspective view of a state in which a cover and a substrate are omitted from a prism actuator according to the present embodiment; FIG. 12 is a perspective view of a part of a prism actuator according to the present embodiment; FIG. 13a is a perspective view of a part of a prism actuator as viewed from a different direction from FIG. 12; FIG. 13b is a partial see-through view in which a prism is coupled to FIG. 13a; and FIG. 14 is a diagram illustrating a tilt direction of a prism actuator according to the present embodiment.

The prism actuator may drive the prism to perform the OIS function. The present embodiment may provide an actuator that rotates or tilts the prism 300 to implement a zoom function. The prism actuator according to the present embodiment may be designed by using a shape memory alloy member (SMA). The present embodiment may comprise an actuator that creates rotation or tilt of a moving part due to shape deformation of a shape memory alloy member while supporting the fixed and movable parts using two or more shape memory alloy members. At this time, the rotation of the moving part may mean rotation within a predetermined range.

In the present embodiment, the configuration in which the prism is omitted can be called an actuator that is distinguished from the prism actuator. That is, the actuator may mean a structure in which the prism is removed from the prism actuator. In this case, the prism may be understood as one configuration of the camera module.

In an embodiment separate from the present embodiment, at least one lens may be disposed at the front end of the prism 300. The lens may have an image side surface convex toward the object side. The lens may have a meniscus shape in which the image side surface is convex toward the object side. Or, the lens may have a shape in which both sides are convex. Meanwhile, the power of the lens can be extremely small. That is, the power of the lens may be little. As the lenses are disposed, the Fno (F-number) may be lowered. That is, an image obtained by the optical system may become brighter.

When viewed from the image side with respect to one surface, the first shape memory alloy member 401 is fixed to a fixed part and the second shape memory alloy member 402 may be coupled to a movable part. At this time, the fixed part may comprise a housing 100 and the movable part may comprise a holder 200 and a prism 300. The movable part comprises one protruded part or protrusion 210, and the protrusion 210 may be in contact with the fixed part at one or more points to become the center of tilt and rotation. In a modified embodiment, the protrusion 210 may be replaced with a ball shape, and a groove in which the ball can be seated may be formed in the fixed part and the movable part. Damping gel or grease may be applied to the protrusion 210. The prism actuator according to the present embodiment may comprise a structure being formed of silicon and served as a stopper to suppress the upper and lower impact sounds.

The prism actuator may comprise a housing 100. The housing 100 may be a stator. That is, when the holder 200, which is a mover, moves, the housing 100 may be maintained in a relatively fixed state. The housing 100 may be formed to surround at least a part of the holder 200. The housing 100 may be formed of an insulator. The housing 100 may be formed of a plurality of wall bodies. The housing 100 may be formed of a plurality of plate-shaped members. The housing 100 may comprise a plurality of side plates.

The housing 100 may comprise a protrusion 110. The protrusion 110 may be formed on an inner side surface of the housing 100. The protrusion 110 may be coupled with a shape memory alloy member 400. The protrusion 110 may be formed in a shape corresponding to the hole 411 of the first coupling part 410 of the shape memory alloy member 400. The protrusion 110 may comprise a polygonal cross-section. Or, the protrusion 110 may comprise a circular cross-section.

The housing 100 may comprise a protruded part 115. The protruded part 115 may be formed on an inner side surface of the housing 100. The protrusion 110 of the housing 100 may be formed on a protruded surface of the protruded part 115. That is, the protrusion 110 and the protruded part 115 may be formed in a two-stage protrusion shape on an inner side surface of the housing 100. The shape memory alloy member 400 may be fixed to the protrude part 115 of the housing 100.

The housing 100 may comprise a groove 120. The groove 120 may be formed by being recessed in an upper surface of the housing 100. The groove 120 may be formed by being recessed in a lower surface of the housing 100. The groove 120 may be formed to avoid interference with the elastic member 500. The groove 120 may be formed at a position corresponding to the connection part 530 of the elastic member 500. Through this, a movable space of the connection part 530 of the elastic member 500 may be secured.

The housing 100 may comprise a protrusion 130. The protrusion 130 may be coupled to the elastic member 500. The protrusion 130 may be inserted into the hole of the elastic member 500. The protrusion 130 may be fusion-bonded while being inserted into the hole of the elastic member 500. The protrusion 130 and the elastic member 500 may be fixed by an adhesive. At this time, a groove for accommodating an adhesive instead of the protrusion 130 may be formed in the housing 100. The protrusion 130 may comprise: a first protrusion being formed on an upper surface of the housing 100 and coupled to the upper elastic member 501; and a second protrusion being formed on a lower surface of the housing 100 and coupled with the lower elastic member 502.

The housing 100 may comprise a groove 140. The groove 140 may be formed on an outer side surface of the housing 100. At this time, the outer side surface of the housing 100 may be referred to as a rear surface or the like. A part of the substrate 600 may be inserted into the groove 140 of the housing 100. In the groove 140 of the housing 100, the substrate 600 may be disposed. The groove 140 of the housing 100 may be formed in a shape corresponding to the shape of a part of the substrate 600.

The prism actuator may comprise a holder 200. The holder 200 may be a mover. The holder 200 may move when a current is applied to the shape memory alloy member 400. At this time, the holder 200 may move integrally with the prism 300. At least a part of the holder 200 may be spaced apart from the housing 100. The holder 200 may be rotated or tilted about a virtual first central axis. The holder 200 may be coupled to the prism 300. The holder 200 may be coupled to the shape memory alloy member 400. The holder 200 may be coupled to the elastic member 500. A damper 700 may be disposed on the holder 200. The holder 200 may be selectively rotated in a clockwise direction (refer to b in FIG. 14) and a counterclockwise direction (refer to a in FIG. 14) about the first central axis of the housework passing through the protrusion 210 as illustrated in FIG. The rotation angle of the prism 300 (angle in the a-b direction in FIG. 14) may be within 6 degrees. That is, the rotation angle to either side of the prism 300 (a or b direction in FIG. 14) may be within 3 degrees. Or, the rotation angle of the prism 300 may be within 4 degrees. The rotation angle to either side of the prism 300 may be within 2 degrees.

The holder 200 may comprise a plurality of side surfaces. The holder 200 may comprise: a first side surface to which the first and second shape memory alloy members 401 and 402 are coupled; and a second side surface to which the third and fourth shape memory alloy members 403 and 404 are coupled. The holder 200 may comprise an inclined surface on which the prism 300 is disposed. The holder 200 may comprise a lower surface facing the substrate 600.

The holder 200 may comprise a protrusion 210. The protrusion 210 may be formed on each of the first side surface and the second side surface of the holder 200. The protrusion 210 may comprise a curved surface. The curved surface of the protrusion 210 of the holder 200 may be disposed in the housing 100. The protrusion 210 of the holder 200 may be a protruded part. The protrusion 210 of the holder 200 may be in mechanical contact with the housing 100.

The part where the holder 200 and the housing 100 abut may be formed such that one side thereof is protruded and the other side thereof is a flat surface. Or, one side thereof may be protruded and the other side thereof may be formed in the form of a groove. That is, a part of the housing 100 corresponding to the protrusion 210 of the holder 200 may be formed in a flat surface. Or, a part of the housing 100 corresponding to the protrusion 210 of the holder 200 may be formed as a groove. Or, a protrusion may be formed in the housing 100 and the protrusion of the housing 100 may be in contact with a flat surface of the holder 200. Or, a protrusion may be formed in the housing 100 and the protrusion of the housing 100 may be disposed in a groove of the holder 200. The shape of the groove formed in the holder 200 or the housing 100 may be a polygon, such as a square, a triangle, or a circle. In the present embodiment, the holder 200 and the housing 100 may be in contact at one or more points through the aforementioned structure. Meanwhile, a portion in which the holder 200 and the housing 100 are in contact may function as a tilt center of the holder 200. The housing 100 may comprise a groove for accommodating a part of the protrusion 220. The groove of the housing 100 may be formed in a shape corresponding to a part of the protrusion 220.

The protrusion 210 is disposed on one surface of the holder 200 and may be disposed on a first virtual straight line connecting the two protrusions 220 being coupled to the shape memory alloy member 400. The protrusion 210 may be disposed on a second virtual straight line connecting the first coupling part 410 of the two shape memory alloy members 400 disposed on one side of the holder 200. At this time, the protrusion 210 may be disposed at a point where the first straight line and the second straight line intersect.

As a modified embodiment, the protrusion 210 of the holder 200 may be replaced with a ball. That is, a ball provided separately from the holder 200 may be disposed between the holder 200 and the housing 100. A groove may be formed in a part of the holder 200 and the housing 100 corresponding to the ball.

The holder 200 may comprise a protrusion 220. The protrusion 220 may be inserted into the hole 421 of the second coupling part 420 of the shape memory alloy member 400. The protrusion 220 may comprise a cylindrical shape. The cross-section of the protrusion 220 may comprise a circular shape. The protrusion 220 may rotate inside the hole 421 of the second coupling part 420 of the shape memory alloy member 400. As a modified embodiment, the protrusion 220 may comprise a polygonal column shape.

The holder 200 may comprise a protruded part 225. The protruded part 225 may be formed on an outer side surface of the holder 200. The protrusion 220 of the holder 200 may be formed on a protruded surface of the protruded part 225. That is, the protrusion 220 and the protruded part 225 may be formed in a two-stage protrusion shape on an outer side surface of the holder 200. The shape memory alloy member 400 may be fixed to the protruded part 225 of the holder 200.

The holder 200 may comprise a groove 230. The groove 230 may be formed by being recessed in an upper surface of the holder 200. The groove 230 may be formed by being recessed in a lower surface of the holder 200. The groove 230 may be formed to avoid interference with the elastic member 500. The groove 230 may be formed at a position corresponding to the connection part 530 of the elastic member 500. Through this, a movable space of the connection part 530 of the elastic member 500 may be secured.

The holder 200 may comprise a protrusion 240. The protrusion 240 may be coupled with the elastic member 500. The protrusion 240 may be inserted into the hole of the elastic member 500. The protrusion 240 may be fusion-bonded while being inserted into the hole of the elastic member 500. The protrusion 240 and the elastic member 500 may be fixed by an adhesive. At this time, the holder 200 may be formed with a groove for accommodating the adhesive instead of the protrusion 240. The protrusion 240 may comprise: a first protrusion being formed on an upper surface of the holder 200 and coupled with the upper elastic member 501; and a second protrusion being formed on a lower surface of the holder 200 and coupled with the lower elastic member 502.

The holder 200 may comprise a groove 250. The groove 250 may be formed on an inner side surface of the holder 200. A space may be formed between the holder 200 and the prism 300 by the groove 250. An adhesive for bonding the prism 300 to the holder 200 may be applied to the groove 250.

The holder 200 may comprise a protruded part 260. The protruded part 260 may be a prism seating end. The protruded part 260 may be formed in a shape corresponding to the outer circumference of the inclined surface of the prism 300. The protruded part 260 may be formed on an inclined surface of the holder 200. In the present embodiment, it is possible to suppress a phenomenon such as blurring of light reflected by the prism 300 by protruding the seating end of the prism. The prism 300 may be disposed in contact with the protruded part 260 of the holder 200. Or, an adhesive may be disposed between the prism 300 and the outer surface of the protruded part 260.

Figure 15:
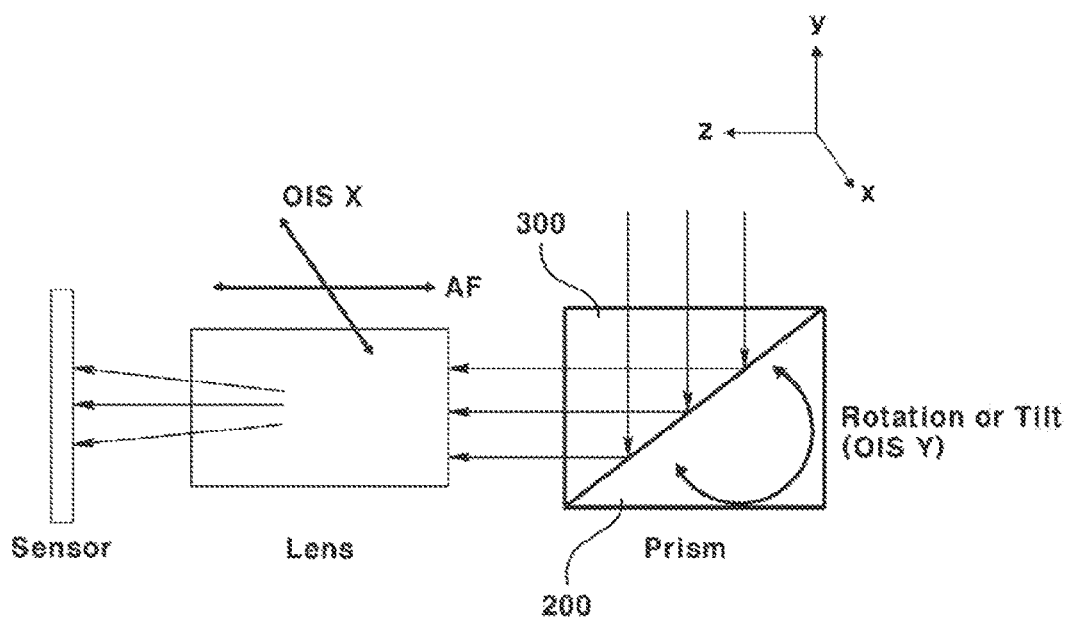
FIG. 15 is a conceptual diagram of a camera device according to the present embodiment.

The prism actuator may comprise a reflectometer or reflector. The prism actuator may comprise a prism 300. The prism 300 may comprise a mirror. The prism 300 may change the path of light introduced from the outside. The prism 300 may reflect light. The prism 300 may be disposed on the holder 200. As illustrated in FIG. 15, when light from the outside is reflected through the prism 300, the OIS Y may be corrected by tilting or rotating. The lens module 20 may move in an optical axis direction to perform auto focus (AF). In addition, the lens module 20 may be moved in a direction perpendicular to the optical axis to correct OIS X. The prism 300 may be formed in the shape of a triangular column. Autofocus may be performed by moving the lens in the z-axis direction (optical axis direction). The correction of OIS X direction may be performed by moving the lens in the x-axis direction (a first direction perpendicular to the optical axis). The correction of OIS Y direction may be performed by rotating the prism 300 to move the light in the y-axis direction (the second direction perpendicular to the optical axis and the first direction) (refer to FIG. 15).

The prism actuator may comprise a shape memory alloy member 400. The shape memory alloy member 400 may connect the housing 100 and the holder 200. The shape memory alloy member 400 may be coupled with the housing 100 at one end part and coupled with the holder 200 at the other end part. The shape memory alloy member 400 may be electrically connected with the substrate 600 through the elastic member 500. When a current is applied to the shape memory alloy member 400, the shape of the shape memory alloy member 400 may be changed. When a current is applied to the shape memory alloy member 400, the length of the shape memory alloy member 400 may be reduced. Conversely, when a current is applied to the shape memory alloy member 400, the length of the shape memory alloy member 400 may increase. The two types of shape memory alloy members mentioned above may be used together in the present embodiment.

The shape memory alloy member 400 may comprise a straight wire shape. Or, the shape memory alloy member 400 may have a plate shape or an S shape. The upper part of the shape memory alloy member 400 may be a part for inputting power. The lower part of the shape memory alloy member 400 may all be connected in common. At this time, a common connection of the shape memory alloy member 400 may be formed in the substrate 600.

The shape memory alloy member 400 may comprise a plurality of shape memory alloy members. The shape memory alloy member 400 may comprise four shape memory alloy members. The shape memory alloy member 400 may comprise first to fourth shape memory alloy members 401, 402, 403, and 404.

The shape memory alloy member 400 may comprise first and second shape memory alloy members 401 and 402 being disposed on one side of the prism 300. The first shape memory alloy member 401 may connect the upper part of the holder 200 and the lower part of the housing 100. The second shape memory alloy member 402 may connect the lower part of the holder 200 and the upper part of the housing 100. A virtual first central axis serving as a tilt center of the prism 300 may pass between the first and second shape memory alloy members 401 and 402. The first central axis may be disposed between the first and second shape memory alloy members 401 and 402.

The shape memory alloy member 400 may comprise third and fourth shape memory alloy members 403 and 404 being disposed on the other side of the prism 300. The imaginary first central axis serving as the tilt center of the prism 300 may pass between the first and second shape memory alloy members 401 and 402 and between the third and fourth shape memory alloy members 403 and 404.

The length of the first shape memory alloy member 401 may decrease when the length of the second shape memory alloy member 402 increases and may increase when the length of the second shape memory alloy member 402 decreases. Referring to FIG. 14, the holder 200 may be rotated clockwise by increasing the length of the first shape memory alloy member 401 and decreasing the length of the second shape memory alloy member 402 (refer to b in FIG. 14). In addition, the holder 200 may be rotated counterclockwise by reducing the length of the first shape memory alloy member 401 and increasing the length of the second shape memory alloy member 402 (refer to a in FIG. 14). At this time, the rotation center may be formed by a part in which the protrusion 210 of the holder 200 and the housing 100 contact each other. Meanwhile, the prism 300 being rotated or tilted together with the holder 200 reflects light during the rotation or tilt process to perform OIS driving.

The lengths of the first and third shape memory alloy members 401 and 403 may be decreased when the lengths of the second and fourth shape memory alloy members 402 and 404 increase. The lengths of the first and third shape memory alloy members 401 and 403 may increase when the lengths of the second and fourth shape memory alloy members 402 and 404 are decreased. The lengths of the first and third shape memory alloy members 401 and 403 may be made to increase as the lengths of the second and fourth shape memory alloy members 402 and 404 are decreased.

The first and fourth shape memory alloy members 401 and 404 may be disposed diagonally opposite to each other. The second and third shape memory alloy members 402 and 403 may be disposed diagonally opposite to each other. The first and third shape memory alloy members 401 and 403 are disposed on one side of the central axis of rotation of the prism 300, and the second and fourth shape memory alloy members 402 and 404 may be disposed on the other side of the central axis of rotation of the prism 300. The first to fourth shape memory alloy members 401, 402, 403, and 404 may be disposed parallel to each other.

The shape memory alloy member 400 may comprise a first coupling part 410. The first coupling part 410 may be coupled to the housing 100. The first coupling part 410 of the shape memory alloy member 400 may be fixed to the housing 100 by an adhesive. The first coupling part 410 may comprise a hole 411. The hole 411 of the first coupling part 410 may have a rectangular shape. The hole 411 of the first coupling part 410 may have a polygonal shape. Or, the hole 411 of the first coupling part 410 may have a circular shape. However, as a modified embodiment, the first coupling part 410 of the shape memory alloy member 400 may be rotatably coupled to the housing 100.

The shape memory alloy member 400 may comprise a second coupling part 420. The second coupling part 420 may be coupled to the holder 200. The second coupling part 420 of the shape memory alloy member 400 may comprise a circular hole 421. The protrusion 220 of the holder 200 may be inserted into the hole 421 of the second coupling part 420. At this time, the hole 421 of the second coupling part 420 may have a circular shape and may have a circular shape corresponding to a cross-sectional view of the protrusion 220 of the holder 200. Through this, the protrusion 220 of the holder 200 may rotate inside the hole 421 of the second coupling part 420. However, in a modified embodiment, the second coupling part 420 may be fixed to the holder 200.

The shape memory alloy member 400 may comprise a connection part 430. The connection part 430 may connect the first coupling part 410 and the second coupling part 420. At least a part of the connection part 430 may be formed of a shape memory alloy member. The connection part 430 may comprise a shape memory alloy member wire. In the present embodiment, one end of the SMA wire may be connected to the driving unit and the other end may be connected to the fixed part. At this time, the angle of the OIS Y direction or OIS X direction can be adjusted by controlling the length of the wire individually or in pairs. In order to drive the wires individually, it may be controlled individually or it is possible to control by connecting each one side of the end part all in common.

In the present embodiment, all of the first coupling part 410, the second coupling part 420, and the connection part 430 may be formed of a shape memory alloy member. However, as a modified embodiment, the first coupling part 410 and the second coupling part 420 may not be formed of a shape memory alloy member, but only the connection part 430 may be formed of a shape memory alloy member.

The prism actuator may comprise an elastic member 500. The elastic member 500 may connect the housing 100 and the holder 200. At least a part of the elastic member 500 may have elasticity. The elastic member 500 may elastically connect the housing 100 and the holder 200. The elastic member 500 may movably support the holder 200 against the housing 100.

The elastic member 500 may comprise a plurality of elastic members. The elastic member 500 may comprise two elastic members. The elastic member 500 may comprise an upper elastic member 501. The upper elastic member 501 may be coupled to an upper surface of the holder 200. The upper elastic member 501 may be coupled to an upper part of the holder 200. The elastic member 500 may comprise a lower elastic member 502. The lower elastic member 502 may be coupled to a lower surface of the holder 200. The lower elastic member 502 may be coupled to a lower part of the holder 200. An elastic member disposed further above than the first substrate 610 may be an upper elastic member 510, and an elastic member disposed further below may be a lower elastic member 520. The upper elastic member 501 may be disposed further above than the reflective surface of the prism 300. The lower elastic member 502 may be disposed further below than the reflective surface of the prism 300. Meanwhile, the direction adjacent to the incident light may be upward.

The elastic member 500 may electrically connect the shape memory alloy member 400 and the substrate 600. The upper elastic member 501 may comprise first and second upper elastic members 501-1 and 501-2. The lower elastic member 502 may comprise first and second lower elastic members 502-1 and 502-2. As illustrated in FIG. 9, each of the first and second upper elastic members 501-1 and 501-2 may comprise first and second elastic units 501*a* and 501*b*. Through this, the upper elastic member 501 may provide four conductive lines between the shape memory alloy member 400 and the substrate 600. The lower elastic member 502 may provide two conductive lines between the shape memory alloy member 400 and the substrate 600. In the present embodiment, the first to fourth shape memory alloy members 401, 402, 403, and 404 are first and second upper elastic members 501-1 and 501-2, respectively, first and second elastic units 501*a* and 501*b* that is, it may be connected to each of the four elastic units. In addition, the first to fourth shape memory alloy members 401, 402, 403, and 404 may be connected in common with the two lower elastic members.

In the present embodiment, the first to fourth shape memory alloy members 401, 402, 403, and 404 may be controlled individually or may be controlled in pairs by two.

The elastic member 500 may comprise a first coupling part 510. The first coupling part 510 may be coupled to the housing 100. The first coupling part 510 may comprise a hole. The protrusion 130 of the housing 100 may be inserted into the hole of the first coupling part 510.

The elastic member 500 may comprise a second coupling part 520. The second coupling part 520 may be coupled to the holder 200. The second coupling part 520 may comprise a hole. The protrusion 240 of the holder 200 may be inserted into the hole of the second coupling part 520.

The elastic member 500 may comprise a connection part 530. The connection part 530 may connect the first coupling part 510 and the second coupling part 520. The connection part 530 may have elasticity. The connection part 530 may be deformed by movement of the second coupling part 520. The length of the connection part 530 may be increased or decreased by the movement of the second coupling part 520.

The elastic member 500 may comprise a terminal part 540. The terminal part 540 may be coupled to the substrate 600. The terminal part 540 may be connected to the substrate 600. The terminal part 540 may be electrically connected to the substrate 600. The terminal part 540 may be coupled to the substrate 600 by a conductive member. For example, the terminal part 540 may be soldered to the substrate 600.

The prism actuator may comprise a substrate 600. The substrate 600 may be disposed in the housing 100. The substrate 600 may comprise a flexible printed circuit board (FPCB). The substrate 600 may supply current to the shape memory alloy member 400. The substrate 600 may comprise a first body being disposed below the holder 200, and a second body being extended from the first body and disposed on an outer surface of the housing 100. The substrate 600 may comprise a terminal. The substrate 600 may comprise a plurality of terminals. The substrate 600 may comprise four terminals. Or, the substrate 600 may comprise eight terminals.

The substrate 600 may comprise a first substrate 610 being disposed below the holder 200, and a second substrate 620 being extended from the first substrate 610 and disposed on one side of the holder 200. The first substrate 610 may be disposed on a lower surface of the holder 200. The second substrate 620 may be disposed on a side surface of the holder 200.

The prism actuator may comprise a damper 700. The damper 700 may function as a shock vibration and noise prevention stopper. The damper 700 may reduce the impact generated by the collision between the holder 200 and other devices. Through this, the impact sound can be reduced. The damper 700 may mechanically limit a stroke. The damper 700 may limit the tilting angle of the holder 200 and the prism 300. The damper 700 may be formed of silicon. The damper 700 may have elasticity.

The damper 700 may comprise a plurality of dampers. The damper 700 may comprise a first damper 710. The first damper 710 may be disposed on an upper surface of the holder 200. The first damper 710 may be disposed on a part of the upper surface of the holder 200 spaced apart from the first central axis. The first damper 710 may be disposed on a part of the upper surface of the holder 200 that is most spaced apart from the first central axis. The first damper 710 may come into contact with the cover 800 or the fixed body by movement of the holder 200. The damper 700 may comprise a second damper 720. The second damper 720 may be disposed on a lower surface of the holder 200. The second damper 720 may be disposed on a part of the lower surface of the holder 200 that is spaced apart from the first central axis. The second damper 720 may be disposed on a part of the lower surface of the holder 200 that is spaced apart from the first central axis. The second damper 720 may be in contact with the substrate 600 or the fixed body by movement of the holder 200. The damper 700 may be disposed in a corresponding groove of the holder 200. The damper 700 may be disposed at an edge of the holder 200. The first damper 710 may be disposed at a corner where the upper surface of the holder 200 and the two side surfaces meet. The second damper 720 may be disposed at a corner where the lower surface of the holder 200 and the two side surfaces meet. The damper 700 may be disposed at a corner of the holder 200.

The prism actuator may comprise a cover 800. The cover 800 may be a cover can. The cover 800 may comprise a 'cover can'. The cover 800 may be disposed at an outer side of the housing 100. The cover 800 may accommodate the housing 100 therein. The cover 800 may form an outer appearance of the prism actuator. The cover 800 may have a substantially hexahedral shape. The cover 800 may be a non-magnetic material. The cover 800 may be formed of a metal material. The cover 800 may be formed of a metal plate. The cover 800 may be connected to the ground part of the printed circuit board. Through this, the cover 800 may be grounded. The cover 800 may block electromagnetic interference (EMI). At this time, the cover 800 may be referred to as an 'EMI shield can'.

Hereinafter, a camera device according to the present embodiment will be described with reference to the drawings.

FIG. 15 is a conceptual diagram of a camera device according to the present embodiment.

The camera device may comprise a camera module.

The camera device may comprise a lens driving device. The lens driving device may be a voice coil motor (VCM). The lens driving device may be a lens driving motor. The lens driving device may be a lens driving actuator. The lens driving device may comprise an AF module. The lens driving device may comprise an OIS module. The lens driving device may comprise a coil and a magnet. The lens driving device may move the lens through electromagnetic interaction between the coil and the magnet.

The lens driving device may comprise a fixed zoom AF module that moves the entire lens. Or, the lens driving device may comprise a continuous zoom AF module that moves some lenses among a plurality of lenses. That is, in the present embodiment, the lens driving device may move all of the plurality of lenses or a part of the plurality of lenses.

The camera device may comprise a lens module 20. The lens module 20 may comprise at least one lens. The lens may be disposed at a position corresponding to the image sensor 60. The lens module 20 may comprise a lens and a barrel. The lens module may be coupled to a bobbin of the lens driving device. The lens module 20 may be coupled to the bobbin by screws and/or adhesives. The lens module 20 may move integrally with the bobbin.

The camera device may comprise a filter. The filter may play the role of blocking light of a specific frequency band from being incident on the image sensor 60 in light passing through the lens module 20. The filter may be disposed parallel to the x-y plane. The filter may be disposed between the lens module 20 and the image sensor 60. A filter may be disposed on the sensor base. As a modified embodiment, the filter may be disposed at the base of the lens drive device. The filter may comprise an infrared filter. The infrared filter may block light in the infrared region from being incident on the image sensor 60.

The camera device may comprise a sensor base. The sensor base may be disposed between the lens driving device and the printed circuit board. The sensor base may comprise a protruded part on which the filter is disposed. An opening may be formed in a part of the sensor base where the filter is disposed so that light passing through the filter may be incident on the image sensor 60. The adhesive member may couple or attach the base of the lens driving device to the sensor base. The adhesive member may additionally play the role of preventing foreign substances from being introduced into the lens driving device. The adhesive member may comprise any one or more of an epoxy, a thermosetting adhesive, and an ultraviolet curable adhesive.

The camera device may comprise a printed circuit board (PCB). The printed circuit board can be a substrate or a circuit board. A lens driving device may be disposed on the printed circuit board. A sensor base may be disposed between the printed circuit board and the lens driving device. The printed circuit board may be electrically connected to the lens driving device. The image sensor 60 may be disposed on the printed circuit board. Various circuits, elements, control units, etc. may be provided on the printed circuit board in order to convert an image formed on the image sensor 60 into an electrical signal and transmit it to an external device.

The camera device may comprise an image sensor 60. The image sensor 60 may have a configuration in which light passing through a lens and a filter is incident to form an image. The image sensor 60 may be mounted on a printed circuit board. The image sensor 60 may be electrically connected to a printed circuit board. For example, the image sensor 60 may be coupled to a printed circuit board by a surface mounting technology (SMT). As another example, the image sensor 60 may be coupled to a printed circuit board by a flip chip technology. The image sensor 60 may be disposed so that the lens and the optical axis coincide. That is, the optical axis of the image sensor 60 and the optical axis of the lens may be aligned. The image sensor 60 may convert light irradiated to the effective image area of the image sensor 60 into an electrical signal. The image sensor 60 may be any one of a charge coupled device (CCD), a metal oxide semiconductor (MOS), a CPD, and a CID.

The camera device may comprise a motion sensor. The motion sensor can be mounted on a printed circuit board. The motion sensor may be electrically connected to the control unit through a circuit pattern provided on the printed circuit board. The motion sensor may output rotational angular velocity information due to the movement of the camera device. The motion sensor may comprise a 2-axis or 3-axis gyro sensor, or an angular velocity sensor.

The camera device may comprise a control unit. The control unit may be disposed on a printed circuit board. The control unit may be electrically connected to a coil of the lens driving device. The control unit may individually control the direction, intensity, and amplitude of the current supplied to the coil. The control unit may control the lens driving device to perform an autofocus function and/or an image stabilization function. Furthermore, the control unit may perform autofocus feedback control and/or handshake correction feedback control for the lens driving device.

The camera device may comprise a connector. The connector may be electrically connected to the printed circuit board. The connector may comprise a port for electrically connecting to an external device.

Hereinafter, an optical device according to the present embodiment will be described with reference to the drawings.

Figure 16:
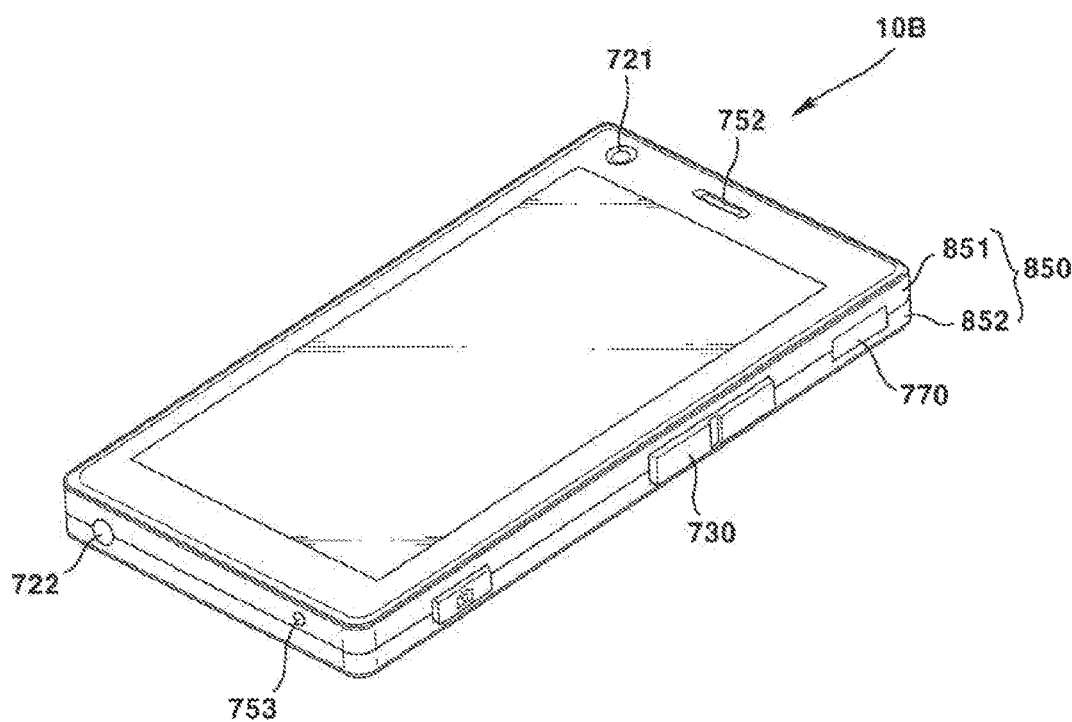
FIG. 16 is a perspective view of an optical device according to the present embodiment.
Figure 17:
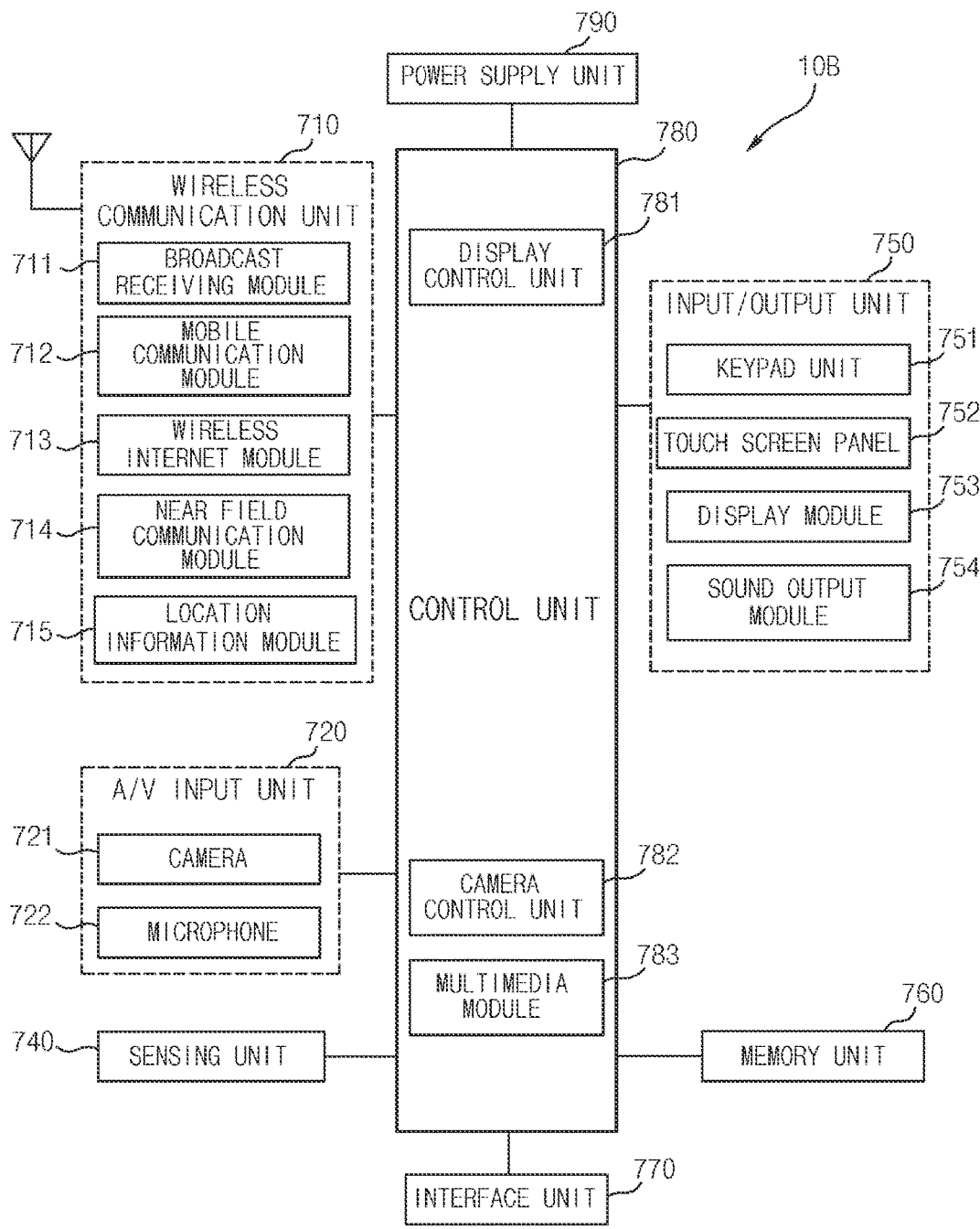
FIG. 17 is a block diagram of an optical device illustrated in FIG. 16.

FIG. 16 is a perspective view of an optical device according to the present embodiment.

The optical device may be any one among a hand phone, a mobile phone, a smart phone, a portable smart device, a digital camera, a laptop computer, a digital broadcasting terminal, a personal digital assistant (PDA), a portable multimedia player (PMP), and a navigation device. However, the type of the optical device is not limited thereto, and any device for photographing an image or a picture may be comprised in the optical device 10B.

The optical device 10B may comprise a main body 850. The main body 850 may have a bar shape. Or, the main body 850 may have various structures, such as a slide type, a folder type, a swing type, a swivel type, in which two or more sub-bodies are coupled to be movable relative to each other. The main body 850 may comprise a case (casing, housing, and cover) forming an outer appearance. For example, the main body 850 may comprise a front case 851 and a rear case 852. Various electronic components of the optical device 10B may be embedded in a space formed between the front case 851 and the rear case 852. A display module 753 may be disposed on one surface of the main body 850. A camera 721 may be disposed on one or more surfaces among one surface of the main body 850 and the other surface being disposed opposite to the one surface.

The optical device 10B may comprise a wireless communication unit 710. The wireless communication unit 710 may comprise one or more modules that enable wireless communication between the optical device 10B and a wireless communication system or between the optical device 10B and a network in which the optical device 10B is located. For example, the wireless communication unit 710 may comprise any one or more among a broadcast receiving module 711, a mobile communication module 712, a wireless Internet module 713, a near field communication module 714, and a location information module 715.

The optical device 10B may comprise an AV input unit 720. The AV (Audio/Video) input unit 720 is for inputting an audio signal or a video signal, and may comprise any one or more among a camera 721 and a microphone 722. At this time, the camera 721 may comprise a camera device according to the present embodiment.

The optical device 10B may comprise a sensing unit 740. The sensing unit 740 may generate a sensing signal for controlling the operation of the optical device 10B by detecting the current state of the optical device such as open/close state of the optical device 10B, location of the optical device 10B, user contact, orientation of the optical device 10B, and acceleration and deceleration of the optical device 10B. For example, when the optical device 10B is in the form of a slide phone, it is possible to detect whether the slide phone is opened or closed. In addition, it may be responsible for sensing functions related to whether the power supply unit 790 is supplied with power, whether the interface unit 770 is coupled to an external device, and the like.

The optical device 10B may comprise an input/output unit 750. The input/output unit 750 may be configured to generate an input or output related to visual, auditory, or tactile sense. The input/output unit 750 may generate input data for controlling the operation of the optical device 10B, and may output information processed by the optical device 10B.

The input/output unit 750 may comprise any one or more of a keypad unit 751, a touch screen panel 752, a display module 753, and a sound output module 754. The keypad unit 751 may generate input data in response to a keypad input. The touch screen panel 752 may convert a change in capacitance generated due to a user's touch on a specific area of the touch screen into an electrical input signal. The display module 753 may output an image photographed by the camera 721. The display module 753 may comprise a plurality of pixels whose color changes according to an electrical signal. For example, the display module 753 may comprise at least one among a liquid crystal display, a thin film transistor-liquid crystal display, an organic light-emitting diode, a flexible display, and a 3D display. The sound output module 754 outputs audio data being received from the wireless communication unit 710 in a call signal reception, a call mode, a recording mode, a voice recognition mode, or a broadcast receiving mode, or audio data stored in the memory unit 760, and the like.

The optical device 10B may comprise a memory unit 760. A program for processing and control of the control unit 780 may be stored in the memory unit 760. In addition, the memory unit 760 may store input/output data, for example, any one or more among a phone book, a message, an audio, a still image, a photo, and a video. The memory unit 760 may store an image photographed by the camera 721, for example, a photo or a video.

The optical device 10B may comprise an interface unit 770. The interface unit 770 serves as a path for connecting to an external device connected to the optical device 10B. The interface unit 770 may receive data from an external device, receive power and transmit it to each component inside the optical device 10B, or transmit data inside the optical device 10B to an external device. The interface unit 770 The interface unit 770 may comprise any one or more among: a wired/wireless headset port; an external charger port, a wired/wireless data port; a memory card port; a port for connecting a device equipped with an identification module; an audio input/output (I/O) port; a video input/output (I/O) port; and an earphone port.

The optical device 10B may comprise a control unit 780. The control unit 780 may control the overall operation of the optical device 10B. The control unit 780 may perform related control and processing for voice call, data communication, video call, and the like. The control unit 780 may comprise a display control unit 781 that controls a display module 753 that is a display of the optical device 10B. The control unit 780 may comprise a camera control unit 782 that controls the camera device. The control unit 780 may comprise a multimedia module 783 for playing multimedia. The multimedia module 783 may be provided inside the control unit 180 or may be provided separately from the control unit 780. The control unit 780 may perform a pattern recognition process capable of recognizing a handwriting input or a drawing input performed on the touch screen as characters and images, respectively.

The optical device 10B may comprise a power supply unit 790. The power supply unit 790 may receive external power or internal power by the control of the control unit 780 to supply power required for operation of each component.

The embodiments of the present invention have been described above with reference to the accompanying drawings, but a person skilled in the art to which the present invention belongs may understand that the present invention can be implemented in other specific forms without changing the technical spirit or essential features. Therefore, it should be understood that the embodiments described above are illustrative and non-limiting in all respects.

The invention claimed is:

1. A prism actuator comprising:
   a housing;
   a holder disposed on the housing and tilted about a virtual first central axis;
   a prism disposed on the holder;

a shape memory alloy member connecting the housing and the holder;
an elastic member connecting the housing and the holder; and
a substrate disposed on the housing,
wherein the shape memory alloy member comprises first and second shape memory alloy members disposed at one side of the prism and third and fourth shape memory alloy members disposed at an other side of the prism,
wherein the first shape memory alloy member connects an upper part of the holder and a lower part of the housing,
wherein the second shape memory alloy member connects a lower part of the holder and an upper part of the housing,
wherein the shape memory alloy member is electrically connected to the substrate through the elastic member,
wherein the first central axis passes between the first and second shape memory alloy members and between the third and fourth shape memory alloy members,
wherein the holder comprises:
  a first side surface to which the first and second shape memory alloy members are coupled; and
  a second side surface to which the third and fourth shape memory alloy members are coupled,
wherein each of the first side surface and the second side surface of the holder is formed with a protrusion comprising a curved surface, and
wherein the curved surface of the protrusion of the holder is disposed on the housing.

2. The prism actuator of claim 1, wherein the shape memory alloy member is coupled to the housing at one end and coupled to the holder at an other end.

3. The prism actuator of claim 1, wherein the shape memory alloy member comprises:
  a first coupling part coupled to the housing;
  a second coupling part coupled to the holder; and
  a connection part connecting the first coupling part and the second coupling part, and
  wherein at least a part of the connection part is formed of a shape memory alloy.

4. The prism actuator of claim 3, wherein the first coupling part of the shape memory alloy member is fixed to the housing by an adhesive.

5. The prism actuator of claim 3, wherein the second coupling part of the shape memory alloy member comprises a circular hole, and
  wherein the holder comprises a protrusion inserted into the hole of the second coupling part.

6. The prism actuator of claim 3, wherein the connection part comprises a shape memory alloy wire.

7. The prism actuator of claim 1,
  wherein the elastic member comprises a first coupling part coupled to the housing, a second coupling part coupled to the holder, a connection part connecting the first coupling part and the second coupling part, and a terminal part coupled to the substrate.

8. The prism actuator of claim 1, wherein the elastic member comprises an upper elastic member coupled to an upper surface of the holder, and a lower elastic member coupled to a lower surface of the holder.

9. The prism actuator of claim 1, comprising:
  a first damper disposed on a part of an upper surface of the holder that is spaced apart from the first central axis; and
  a second damper disposed on a part of a lower surface of the holder spaced apart from the first central axis.

10. The prism actuator of claim 1, wherein the first and fourth shape memory alloy members are disposed diagonally opposite to each other, and
  wherein the second and third shape memory alloy members are disposed diagonally opposite to each other.

11. A camera device comprising:
a printed circuit board;
an image sensor disposed on the printed circuit board;
the prism actuator of claim 1;
a lens disposed between the image sensor and the prism actuator; and
a lens driving device configured to move the lens.

12. An optical device comprising:
a main body;
the camera device of claim 11 disposed on the main body; and
a display module disposed on the main body and configured to output an image photographed by the camera device.

13. A prism actuator comprising:
a housing;
a holder disposed on the housing;
a prism disposed on the holder;
a shape memory alloy member connecting the housing and the holder;
an elastic member connecting the housing and the holder; and
a substrate disposed on the housing,
wherein the elastic member comprises a first coupling part coupled to the housing, a second coupling part coupled to the holder, a connection part connecting the first coupling part and the second coupling part, and a terminal part coupled to the substrate, and
wherein the shape memory alloy member is electrically connected to the substrate through the elastic member.

14. The prism actuator of claim 13, wherein the shape memory alloy member comprises first and second shape memory alloy members disposed at one side of the prism, and
  wherein a length of the first shape memory alloy member decreases when a length of the second shape memory alloy member increases and increases when the length of the second shape memory alloy member decreases.

15. The prism actuator of claim 14, wherein the holder is tilted about a virtual first central axis, and
  wherein the first central axis passes between the first and second shape memory alloy members.

16. A prism actuator comprising:
a housing;
a holder disposed on the housing and tilted about a virtual first central axis;
a prism disposed on the holder;
a shape memory alloy member connecting the housing and the holder;
an elastic member connecting the housing and the holder; and
a substrate disposed on the housing,
wherein the shape memory alloy member comprises first and second shape memory alloy members disposed at one side of the prism and third and fourth shape memory alloy members disposed at an other side of the prism,
wherein a length of the first shape memory alloy member decreases when a length of the second shape memory alloy member increases and increases when the length of the second shape memory alloy member decreases, wherein the shape memory alloy member is electrically connected to the substrate through the elastic member,
wherein the first shape memory alloy member connects an upper part of the holder and a lower part of the housing,
wherein the second shape memory alloy member connects a lower part of the holder and an upper part of the housing,
wherein the shape memory alloy member is electrically connected to the substrate through the elastic member,
wherein the first central axis passes between the first and second shape memory alloy members and between the third and fourth shape memory alloy members,
wherein the holder comprises:
   a first side surface to which the first and second shape memory alloy members are coupled; and
   a second side surface to which the third and fourth shape memory alloy members are coupled,
wherein each of the first side surface and the second side surface of the holder is formed with a protrusion comprising a curved surface, and
wherein the curved surface of the protrusion of the holder is disposed on the housing.

\* \* \* \* \*